(12) United States Patent
Akke

(10) Patent No.: US 11,165,244 B2
(45) Date of Patent: Nov. 2, 2021

(54) METHOD AND DEVICE FOR FAULT DETECTION AND PROTECTION OF ELECTRICAL NETWORKS

(71) Applicant: DLABORATORY SWEDEN AB, Lund (SE)

(72) Inventor: Magnus Akke, Lund (SE)

(73) Assignee: DLABORATORY SWEDEN AB, Lund (SE)

( * ) Notice: Subject to any disclaimer, the term of this patent is extended or adjusted under 35 U.S.C. 154(b) by 36 days.

(21) Appl. No.: 16/756,707

(22) PCT Filed: Oct. 31, 2018

(86) PCT No.: PCT/SE2018/051116
§ 371 (c)(1),
(2) Date: Apr. 16, 2020

(87) PCT Pub. No.: WO2019/088908
PCT Pub. Date: May 9, 2019

(65) Prior Publication Data
US 2021/0203153 A1    Jul. 1, 2021

(30) Foreign Application Priority Data

Oct. 31, 2017    (SE) .................................... 1751348-2

(51) Int. Cl.
*H02H 9/02* (2006.01)
*H02J 3/00* (2006.01)
(Continued)

(52) U.S. Cl.
CPC .............. *H02H 9/02* (2013.01); *H02H 3/083* (2013.01); *H02H 3/165* (2013.01); *H02H 7/26* (2013.01); *H02J 3/001* (2020.01)

(58) Field of Classification Search
CPC .......... H02H 3/083; H02H 3/165; H02H 3/34; H02H 3/347; H02H 3/06; H02H 7/26;
(Continued)

(56) References Cited

U.S. PATENT DOCUMENTS 4,454,394 A * 6/1984 Toyoda ................ H01H 33/166
218/6
5,808,845 A   9/1998 Roberts
(Continued)

FOREIGN PATENT DOCUMENTS

CN        103580009 A     12/2014
EP        0316203 B1       3/1994
(Continued)

OTHER PUBLICATIONS

International Search Report and Written Opinion for Corresponding International Application No. PCT/SE2018/05116 dated Jan. 10, 2019.

*Primary Examiner* — Harry R Behm
(74) *Attorney, Agent, or Firm* — Renner, Otto, Boisselle & Sklar, LLP

(57) ABSTRACT

A method and a device for detecting faults and for protection of electrical networks, the electrical networks being fed from a transformer station through a first three-phase switching device with circuit breaker, a distribution network and feeders. A second three-phase switching device with circuit breaker is connected before the feeders. The circuit breaker of the second switching device, has parallel-coupled damping impedances and is connected in series between the first three-phase switching device and the feeders when a short circuit current is detected. At least one of the damping impedances has deviating properties compared to the others, so as to create a negative sequence current detectable in the electrical networks. The damping impedances are bypassed (Continued)

by the circuit breaker of the second switching device after a predetermined period of time.

9 Claims, 5 Drawing Sheets

(51) Int. Cl.
*H02H 3/16* (2006.01)
*H02H 7/26* (2006.01)
*H02H 3/08* (2006.01)

(58) Field of Classification Search
CPC .......... H02H 9/02; H02J 3/001; H02J 3/0012; H02J 3/00125
See application file for complete search history.

(56) References Cited

U.S. PATENT DOCUMENTS

| | | | |
|---|---|---|---|
| 2012/0063181 A1* | 3/2012 | Chimento | H02M 7/793 363/56.03 |
| 2014/0071565 A1 | 3/2014 | Blumschein et al. | |
| 2017/0331274 A1 | 11/2017 | Akke | |
| 2018/0287371 A1* | 10/2018 | Nyberg | H02J 3/36 |
| 2019/0326845 A1* | 10/2019 | Pokkinen | H02M 7/5387 |
| 2020/0076323 A1* | 3/2020 | Yonemura | G01R 31/40 |

FOREIGN PATENT DOCUMENTS

| | | | |
|---|---|---|---|
| EP | 0632559 B1 | 8/1998 | |
| SE | 1650635 A1 | 11/2017 | |

* cited by examiner

METHOD AND DEVICE FOR FAULT DETECTION AND PROTECTION OF ELECTRICAL NETWORKS

This application is a national phase of International Application No. PCT/SE2018/051116 filed Oct. 31, 2018 and published in the English language, which claims priority to Swedish Application No. 1751348-2 filed Oct. 31, 2017, both of which are hereby incorporated herein by reference.

TECHNICAL AREA

This invention presents a method and device which give an effective protection for all types of electrical faults in an electrical network. The protection can be used for all type of shunt faults including three phase faults. The invention can be used for fault clearing in all type of networks irrespectively of system grounding. The invention targets networks with radial structure, but can be generalized to meshed networks.

BACKGROUND

A power grid, or network, can have several different voltage levels. In Sweden, for example, nominal voltages can be 400 kV, 220 kV, 130 kV, 50 kV, 36 kV, 20 kV, 10 kV, 6 kV, 600 V and 400 V. It is most common that the grid has three phases and use alternating voltage.

The type of grounding used for the grid is very important to know, to apply the appropriate relaying principle for disconnection of earth faults. There are several different types of network grounding. In American technical literature such as "Power distribution for industry" (ANSI/IEEE 141 1986), the following alternatives for network grounding are given Solid grounding (without any intentional impedance in the network neutral point);
Coil grounding;
Resistance grounding with low, or high resistance;
Isolated neutral point.

Swedish patent SE1650635-4 describes one method for disconnection of earth faults in looped networks with non-effectively grounded neutral point. The usability of SE1650635-4 is limited to ground faults in non-effectively grounded networks.

The background and justification for the present application are as follows. Only earth faults in non-efficient grounded networks have fault currents that are below the network rated current, that is, the largest current the network can operate under normal conditions. For short-circuits between two or three phases, the current magnitude can exceed 10 times the rated current. Since the power output during a fault is proportional to the current in square, power output can be 100 times greater than at rated current. Therefore, electric networks need to have a fault clearing system that quickly disconnect faults in the network, which limits the risk of injury to people and hardware.

STATE OF THE ART FOR FAULT CLEARING IN ELECTRIC NETWORK

Fault clearing are usually included in basic courses in electrical power at most technical universities. There are many publications such as textbooks and thesis works which usually present excellent background information. In order to make the present text more readable and independent, some background information is also included in the application.

A good standard work which describes the analysis of various electrical faults in power grids is Paul Anderson, Analysis of faulted power system, [A1995] found in the reference list. This reference presents that there are different fault types and different methods for analyzing each of these. We have chosen to use the same type of notations as this US reference [A1995], which means that the three phases are denoted by indexes a, b, c and earth denoted by g for "ground." According to the current IEC standard, valid in Europe, the three phases are denoted by L1, L2, L3. Thus, the American phase notations, a, b, c correspond to the European phase notations L1, L2, L3.

The different fault types are usually divided into two main categories, shunt faults and series faults. In addition, there is a special case called "simultaneous faults" which is more of a special case with less practical significance in our context.

Normally, an AC power network has three different phases. The most common fault type is shunt fault, that is, when a conductor (phase) comes into contact with another conductor (phase) or ground. A serial fault is more unusual and occurs, for example, in the event of interruption of a phase conductor in an overhead line, leaving the conductor freely hanging in the air. Combinations of series faults and shunt faults may occur, for example if a phase conductor in an overhead line goes off and comes into contact with the ground or any grounded object. Shunt faults is the most common fault type and series faults is more unusual. Therefore, the analysis of faults in the grid usually constitutes four types of shunt faults.

The four types of shunt faults are:
Single-Line-Ground, SLG;
Line-to-Line, LL;
Double Line-to-Ground, 2LG;
Three-phase, LLL.

With this said, the following text is limited to these four types of shunt faults, with the abbreviations LLL, 2LG, LL, SLG, respectively. According to a note 2, on page 52, in reference [A1995], which in turn refers to the Westinghouse Transmission and Distribution Reference Book, the typical occurrence of three-phase faults is about 5%; Double Line-to-Ground faults about 10%; Line-to-Line faults about 15% and Single-Line-Ground faults about 70% of all faults.

The calculation method most commonly used is to analyze faults in the grid is called "symmetrical components". The reference [A1995] contains a more detailed description of symmetrical components and how the method is used to analyze various faults in the power network. Network quantities, such as current, voltage and impedance are described by vectors, which are a complex numbers with a magnitude and phase angle. The equations at the fault location are expressed in phase quantities and then transformed into symmetrical components.

For the symmetrical components, the following terms are used: $I_0$ is zero-sequence current; $I_1$ is positive-sequence current; and $I_2$ is zero-sequence current. If currents are described with reference to phases, indexes a, b, c are used according to US practice. For voltage, the same type of index designation is used.

The following equation shows the relation between the three phase currents $I_a$, $I_b$, $I_c$ and its corresponding symmetrical components.

$$\begin{pmatrix} I_0 \\ I_1 \\ I_2 \end{pmatrix} = A^{-1} \begin{pmatrix} I_a \\ I_b \\ I_c \end{pmatrix} \quad (1)$$

where the matrix $$A^{-1} = \frac{1}{3} \begin{pmatrix} 1 & 1 & 1 \\ 1 & a & a^2 \\ 1 & a^2 & a \end{pmatrix} \quad (2)$$

The following equation is used to transformation from symmetrical components to phase-quantities, $$\begin{pmatrix} I_a \\ I_b \\ I_c \end{pmatrix} = A \begin{pmatrix} I_0 \\ I_1 \\ I_2 \end{pmatrix} \quad (3)$$

Where the matrix A is, $$A = \begin{pmatrix} 1 & 1 & 1 \\ 1 & a^2 & a \\ 1 & a & a^2 \end{pmatrix} \quad (4)$$

The notation a, is used for an operator which gives a phase shift of 120 degrees. Thus, $$a = \exp\left(j\frac{2\pi}{3}\right) = -\frac{1}{2} + j\frac{\sqrt{3}}{2} \quad (5)$$

Which give that $|a|=1$ and $\arg(a) = <a = 120°$

The motivation to do fault calculations using symmetrical components is that calculations with symmetrical components become considerably easier to perform without any computer aids. Power grids consist largely of overhead lines, cables and transformers. The problem of doing calculations with phase quantities is that the phases have mutual inductive coupling between them, which complicates calculations in phase quantities, as compared to the use of symmetrical components.

To illustrate the advantage of using symmetrical components, Example 4.1 is used, from reference [A1995], which shows the geometry of a typical American 69 kV overhead line. The relation between voltage drops across the line and its current can be written as $$\begin{pmatrix} U_a \\ U_b \\ U_c \end{pmatrix} = Z_{abc} \begin{pmatrix} I_a \\ I_b \\ I_c \end{pmatrix} \quad (6)$$

where $Z_{abc}$ is a matrix with the structure $$Z_{abc} = \begin{pmatrix} z_{aa} & z_{ab} & z_{ac} \\ z_{ba} & z_{bb} & z_{bc} \\ z_{ca} & z_{cb} & z_{cc} \end{pmatrix} \quad (7)$$

The diagonal element of the matrix represents the self-inductance and other elements off-diagonal elements describe the mutual inductive coupling between the phases. Reference [A1995] describes how these elements are calculated based on the characteristics of the wire, such as geometry and conductor area. Typical values for an American 69 kV over-head line [Example 4.2, A1995], which is converted to 50 Hz, and given per km are, $$Z_{abc} = \begin{pmatrix} 0.194 + j0.760 & 0.050 + j0.334 & 0.050 + j0.347 \\ 0.050 + j0.334 & 0.194 + j0.760 & 0.050 + j0.343 \\ 0.050 + j0.347 & 0.050 + j0.343 & 0.194 + j0.760 \end{pmatrix} \text{ ohm/km}$$

The matrix $Z_{abc}$ is a full matrix with elements which have the same order of magnitude. Suppose we want to calculate the voltage drop over the line's three phases, $$U_{abc} = \begin{pmatrix} U_a \\ U_b \\ U_c \end{pmatrix} \quad (8)$$

For a known three-phase current $$I_{abc} = \begin{pmatrix} I_a \\ I_b \\ I_c \end{pmatrix} \quad (9)$$

If phase-quantities are used, we must use the relation $$U_{abc} Z_{abc} \cdot I_{abc} \quad (10)$$

This requires a matrix calculation that can be perceived as complicated, especially without computer support. If the calculation is to be done with symmetrical components, then the conversion of the impedance matrix from phase quantities to symmetrical components is calculated as $$Z_{012} = A^{-1} \cdot Z_{abc} \cdot A \quad (11)$$

which can be reformulated to $$Z_{abc} = A \cdot Z_{012} \cdot A^{-1} \quad (12)$$

For the impedance matrix above we get $$Z_{012} = \begin{pmatrix} 0.294 + j1.443 & -0.004 - j0.001 & 0.004 - j0.001 \\ 0.004 - j0.001 & 0.145 + j0.419 & 0.008 + j0.001 \\ -0.004 - j0.001 & -0.008 + j0.001 & 0.145 + j0.419 \end{pmatrix}$$

The diagonal elements magnitudes are much larger than all off-diagonal elements. Therefore, it is a fair approximation to use only the diagonal element of the matrix, which gives the approximation $$Z_{012} \approx \begin{pmatrix} 0.294 + j1.443 & 0 & 0 \\ 0 & 0.145 + j0.419 & 0 \\ 0 & 0 & 0.145 + j0.419 \end{pmatrix}$$

The diagonal elements in the matrix $Z_{012}$ are the three impedances which are named, respectively, zero-sequence impedance $z_0$, positive-sequence impedance $z_1$, and negative-sequence impedance $z_2$, as defined in the next equation $$Z_{012} = \begin{pmatrix} z_0 & 0 & 0 \\ 0 & z_1 & 0 \\ 0 & 0 & z_2 \end{pmatrix} \quad (13)$$

By reformulating the relation between voltage drops across the line, and its current, in symmetrical components, one can write $$\begin{pmatrix} U_0 \\ U_1 \\ U_2 \end{pmatrix} = Z_{012} \begin{pmatrix} I_0 \\ I_1 \\ I_2 \end{pmatrix} \quad (14)$$

Since the matrix $Z_{012}$ is diagonal, as given by Eq. (13), then Eq. (14) results in three scalar equations for the symmetrical components, namely $$U_0 = z_0 \cdot I_0 \quad (15.1)$$

$$U_1 = z_1 \cdot I_1 \quad (15.2)$$

$$U_2 = z_2 \cdot I_2 \quad (15.3)$$

One strong motivation to use symmetrical components is to avoid using matrix calculations and get simple scalar equations which describe the grid. In mathematical terms, phase quantities are transformed into symmetrical components that are orthogonal and decoupled, which simplifies the network analysis.

At normal operation of a healthy power grid, only positive-sequence current $I_1$ is present, and the negative and zero-sequence current are both approximately zero, that is, $I_0 \approx I_2 \approx 0$.

If a power grid is affected by a shunt fault, of one of the three types (SLG, LL, LLG), that is, all faults except for LLL, then the negative and zero sequence currents will have magnitudes that significantly exceed zero. Therefore, it is common practice that the negative and zero sequence components are used to detect faults in networks, and are often used in digital relay protection, see for example the article [P1977]. A major advantage of protection based on the negative and zero sequence components, is that they get high sensitivity to detect shunt faults. The high sensitivity is obtained because for a healthy power grid, both negative and zero sequence currents are approximately zero, that is, $I_0 \approx I_2 \approx 0$, which means that even small changes can be detected.

An important observation is that faults of the type three-phase faults (LLL) give a large positive sequence component only, and normally both negative and zero-sequence components are very close to zero. Therefore, relay protection based on negative and zero-sequence components cannot be used to detect three-phase faults. The common approach is that relay protection for three-phase short-circuits is based on the current magnitude only. In order for a relay protection to detect a three-phase short circuit, the current magnitude must be significantly larger than the normal current magnitude. Therefore, it is difficult to achieve the same sensitivity for three-phase faults as for the other fault types.

An alternative measurement principle for relay protection is to use the negative sequence current to disconnect the faulted part of the electric network. This measurement principle is less common in Sweden, but several major manufacturers such as General Electric (GE), Schweitzer Engineering Laboratories (SEL), and Toshiba have realized the advantage of using negative sequence protection and have several patents in this area. Some of these patents are discussed below European Patent 0 316 203 B1, by General Electric, describes directional overcurrent protection based on negative sequence current. The patent describes that directional overcurrent protection can be advantageously used in power grids to determine if a fault is within or outside the protected zone. The patent points out that directional protection based on negative sequence current is particularly useful because negative sequence improves both security and selectivity, leading to improved better configuration capabilities and increased sensitivity to detect faults.

The U.S. Pat. No. 5,808,845 by Schweitzer Engineering Laboratories, describes directional over-current protection based on negative sequence current. The protection uses negative sequence for voltage and currents to detect the fault direction, that is, if the fault is in forward or backward direction with reference to the relay location.

The patent EP0632559 B1 by Toshiba, refers to a patent for negative-sequence time-over-current relay protection, where the application is protection of multiphase synchronous machines.

From the above-referenced patents, it can be concluded that relay protection based on negative sequence current have many advantages. The major drawback is that all the ideas described in patents above, do NOT work for three-phase faults which lacks negative sequence current. Hence three-phase faults need another type of protection. Therefore, it is not possible to fully exploit the benefits of relay protection based on negative current. The present patent application seeks to solve this problem.

DESCRIPTION OF NETWORK COMPONENTS AND SYSTEM GROUNDING OF ELECTRIC NETWORKS

The Swedish patent SE536143A presents a detailed discussion of various aspects of earth fault protection in coil grounded networks. There are many different types of switching devices used in electrical grids. The switching devices are used to connect, conduct current and break current during normal operation and under abnormal conditions, such as short-circuiting. Some examples of switching devices are: vacuum contactors, disconnectors, load disconnectors, fused load disconnectors, and circuit breakers. They all have different rated data for current interrupting capacity and operation time, which means they are used for different tasks in the network. Circuit breakers are switching devices capable of breaking at high current levels of thousands of amps. The price tag of different switching devices is largely determined by its performance. Short operating time and high breaking capacity usually means a higher price. This explains that a circuit breaker with an operation time of 20-60 ms and breaking capacity up to 20 kA, which can be present at short circuit, is a relatively expensive component. Switching devices with breaking capacity limited to load current during normal operation, such as a vacuum contactor and load disconnector, cost less and can be utilized to find more cost-efficient design alternatives of electric networks.

In many countries the regulatory authorities put some requirements on the owners of power grids. In Sweden, the Energy Market Inspectorate has issued regulations for voltage quality, EIFS 2013. The regulation stipulates the longest allowed time for different types of short-term voltage drops.

For distribution networks with voltage below 45 kV, then 6§, Table 3 applies. The present regulation on voltage quality, states that if the voltage magnitude is less than 40% of nominal voltage, then the maximum allowed time is 1.0 second. The practical implication of this requirement is that all short-circuit protection in the network must operate so fast that all short circuits are cleared in less than 1 second.

SUMMARY OF THE INVENTION

No prior art has been found that deliberately limits the current amplitude and at the same time creates an unsymmetrical current which can be used to detected negative sequence current for all shunt faults including three-phase faults.

The invention relates to a method and device which, under electrical faults in the power grid, temporarily connects an unsymmetrical current limiter which creates a temporary negative sequence current which enables relay protection functionality based on negative sequence current. This is valid for all types of shunt faults including three-phase faults. The invention can be used for fault clearing in all types of networks regardless of system grounding. The invention is primarily suitable for radially-fed networks, but can also be generalized to meshed grids.

A fault current which is limited to rated current has several advantages. An advantage is that the network components do not suffer thermal or mechanical stress when the fault is present, which means that component stress does not limit the maximum permissible fault clearing time. Instead, the longest fault clearing time might be restricted by voltage quality limits, typically authorities' requirements on temporary voltage drops. Specifically, this means that the longest fault clearing time can be set in the scale of seconds, rather than fractions of a second. An additional advantage is that fault disconnection can be done by simpler and less expensive switching devices with breaking capacity limited to rated current.

The invention aims to solve, or mitigate, the effect of some open problem, namely
- To use negative-sequence protection for all fault types, including three-phase faults.
- Limit the fault current for all fault types which reduces the thermal and mechanical stress caused by the fault current, resulting in lower cost of switching equipment. Specifically, expensive breakers can be replaced by, for example, vacuum contactors or load-disconnectors with shunt release.
- A fast limitation of high amplitude short-circuit currents also reduces the harmful stress caused by extremely high currents, which influence the life time of transformers and other components.

When the fault current is limited, the thermal stress is also reduced which enables longer fault clearing times. To determine the longest allowed fault clearing time, it is likely that voltage quality requirements might be the limiting factor, not thermal stress. Longer maximum fault clearing times also facilitate the introduction of relay protection systems with more selectivity levels, which can be used for more advanced protection schemes that can be used to facilitate closed loop operation, illustrated by Example 4 below.

BRIEF DESCRIPTION OF FIGURES AND DRAWINGS

In order to make the manner in which the above and other advantages and objects of the invention more easily understood, a more detailed description of the above-mentioned invention will be reproduced with reference to certain embodiments shown in the following drawings.

With the understanding that these drawings show only typical embodiments of the invention and are not to be construed as limiting its scope, the invention will be described and explained in detail and with further details with reference to the accompanying drawings, in which FIG. 1 shows the symbols used in this patent document.

DETAILED DESCRIPTION

Figure 1:
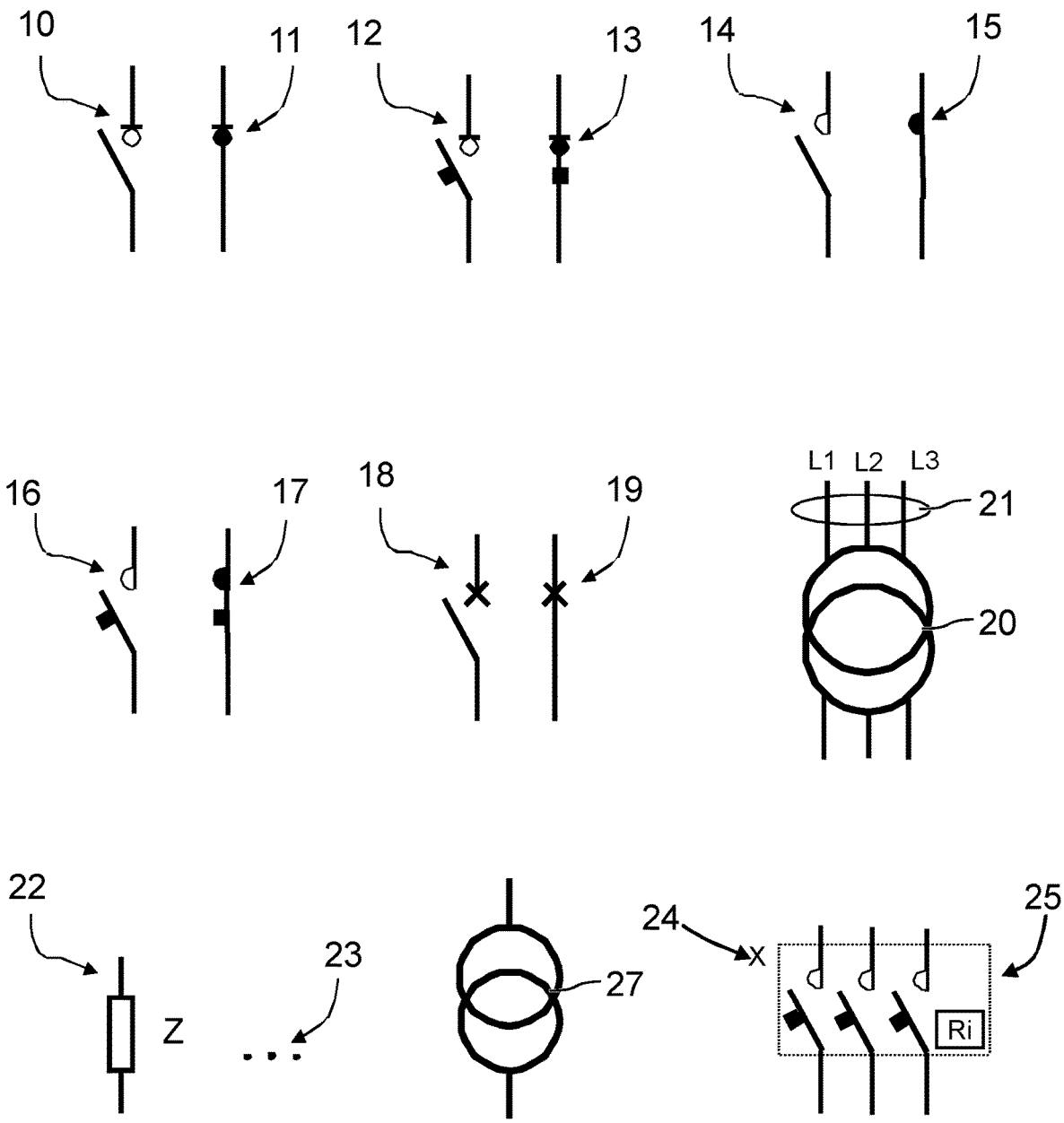

Unless otherwise stated, the symbols in the drawings follow the standard IEC 60617-7.

FIG. 1 shows some of the symbols used below. The top row, to the left, shows a load disconnector in open position 10 and a load disconnector in the closed position 11. The top row, in the middle, shows a load disconnector with automatic disconnection in open position 12 and corresponding at the end position 13. At the far right is a contactor at Off-state 14 and on 15 in On-state.

FIG. 1, middle line, shows a contactor with automatic shunt trip in offstate 16 and in on-state in 17. In the middle, a circuit breaker is shown, in off-state 18 and in on-state 19. At the far right of the middle row, a three-phase transformer 20 is shown with a three-phase line 21 with the three phases L1, L2 and L3.

FIG. 1 at the left bottom shows, an impedance 22 with the value Z. The points 23 indicate repetition of the previous symbol or denomination. At the middle bottom is a three-phase transformer 27 with a common denomination for the three phases. To the far right, a three-phase coupling device 25 is shown with X as a name 24 where the symbols in the rectangle specify the type of coupling equipment used In power systems, different types of relay protection are used to protect equipment and hardware from harmful fault currents. In the following description and in the different electric networks used, there are five main types of relay protection systems. These are called R1-R5 and are shown in a box for the respective switching devices in the different figures. The three-phase equipment 25 of FIG. 1 is shown with the general protection system R1.

The relay protection system of the variant R1 consists of a two-stage overcurrent protection, where the first stage has invert-time characteristics that primarily protect against overload and the second stage has constant-time characteristic which protects against short circuits. In addition, R1 has a neutral-voltage protection with constant-time characteristic which protects against earth fault.

The relay protection system of the variant R2 consists of directional earth fault protection with constant-time delay, and a two-stage overcurrent protection of the same type as the variant R1.

The relay protection system of variant R3 operates, if the current exceeds the pre-set limit, the current limiting impedances are activated by opening the associated switch for a set time, typically 1.0 seconds, then the switch is closed again and the current limiting impedances are bypassed and thus inactivated. Typically, this system can consist of an overcurrent protection with a constant-time delay which opens the switch, combined with the re-energizing device, which re-closes the switch after a preset time.

The relay protection system according to variant R4 consists of a directional earth fault protection with constant-time characteristic, as well as a directional negative-sequence current protection with constant-time characteristic. If the measured current exceeds the rated data of the switching equipment, all protection functions of variant R4 are blocked and the relay protection system cannot issue a trip signal to the switching device, which typically can be a vacuum contactor.

The relay protection system of variant R5 consists of two directional constant-time earth fault protection and two directional negative-current protections with constant-time characteristic. Of the two protections of the same type, one is directed backwards towards the downstream secondary substation with lower notation-index, and the other is directed towards the upstream secondary substation with higher notation-index. Directional negative sequence protection is described in literature and various patents, e.g., EP0316203 B1. If the measured current exceeds the contactor's rated data, the relay protection system of variant R5 is blocked and does not issue any trip signal.

Figure 2:
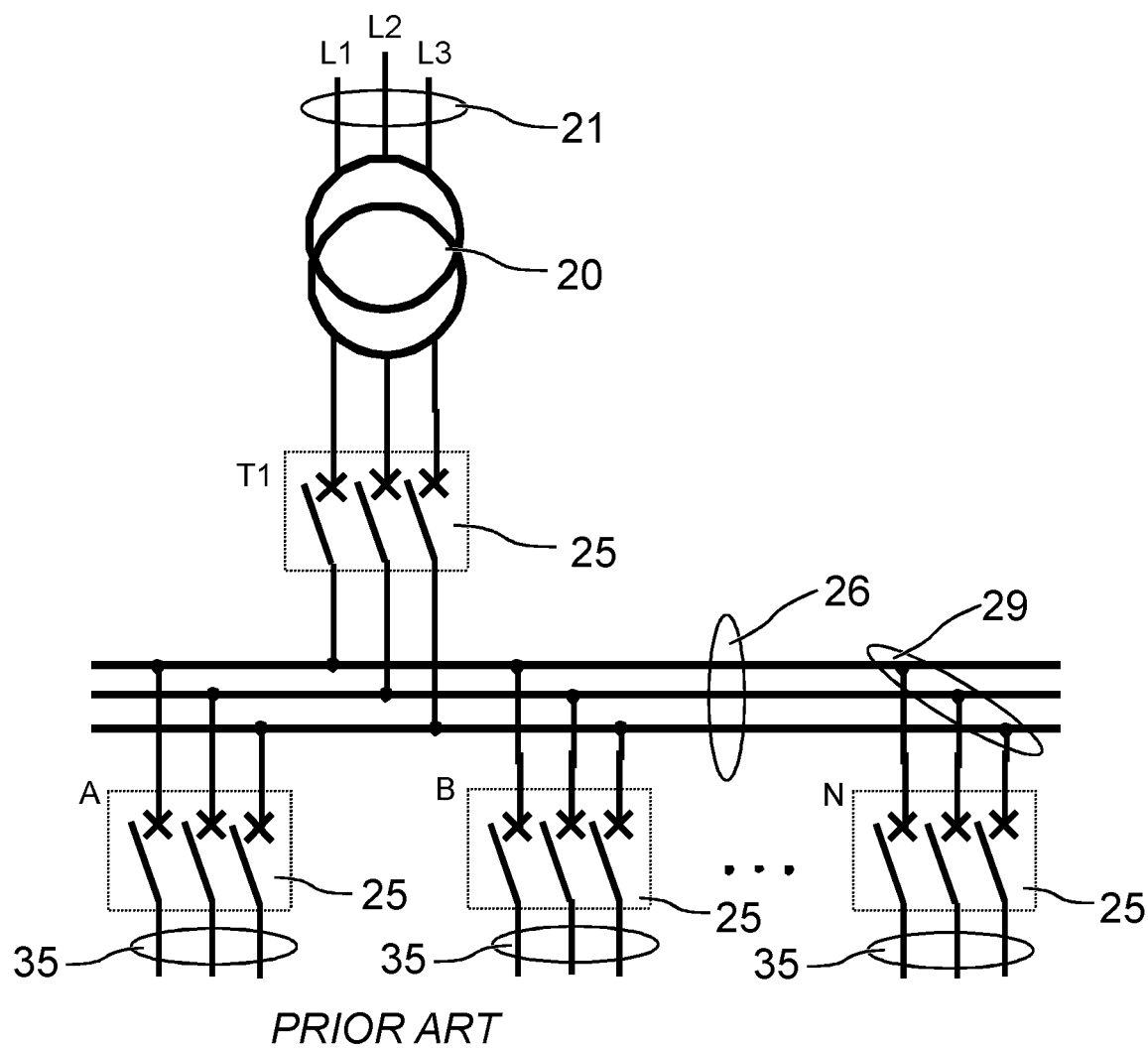
FIG. 2 shows prior art to design a transformer station with feeders. The three phases are shown individually and the diagram is called a three-phase diagram.

FIG. 2 shows a conventional solution with in-feed from a tree-phase transformer 20 which is connected by the three-phases L1, L2 and L3, and by a three phase line 21. The in-feed to the three-phase distribution network 26 is by a three-phase switching device 25 which is a circuit breaker. From the substation 26, output 29 connects to several radians feeders which operated as open loops 35 via three-phase switching devices 25 which are circuit breakers. There may be A-N sets of coupling equipment (switching devices) to the feeders 35. The three-phase switching devices used in this solution are circuit breakers which is a relatively costly component.

Figure 3:
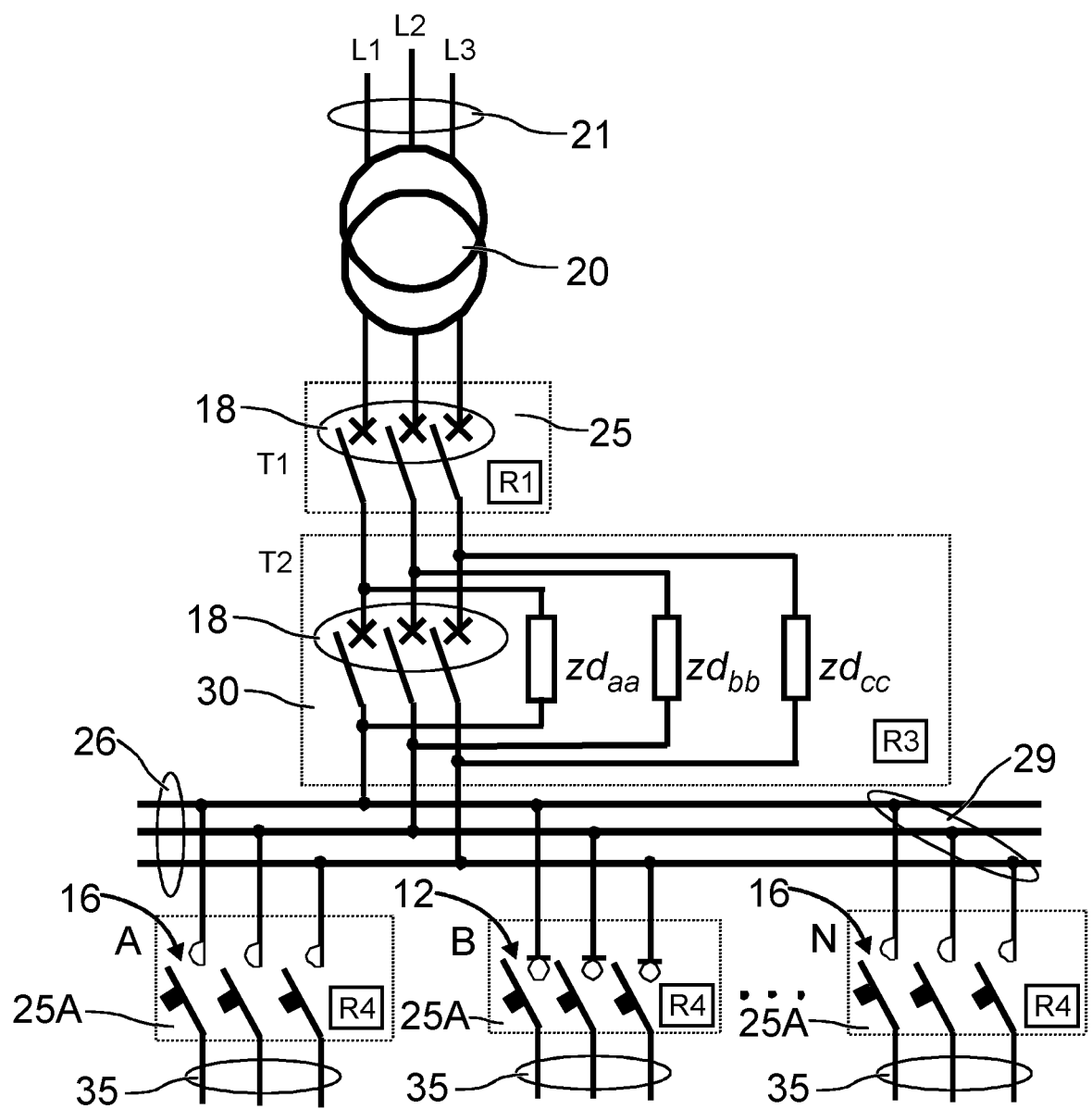
FIG. 3 is a three-phase diagram showing an embodiment of a transformer station with feeders where new technology is applied in accordance with the present invention.

FIG. 3 shows a principal embodiment of the invention and unless otherwise indicated, the following text refers to FIG. 3 and its notations.

In order to explain the invention, a radial-fed network is used, which is fed from the transformer 20, that is, at short circuit in the network, all short-circuit current comes from the transformer and none of the healthy outputs have any significant contribution to the short-circuit current.

1. A fault clearing system based on negative-sequence current is introduced in the network. The settings of the relay protection system must be selective.
2. In series with the transformer's regular switching device 25, with the name T1, an additional three-phase circuit breaker 30 with the name T2 is connected. The outputs from the substation are radial feeders 29 which use load disconnectors 12 or contactors 16. The switching devices 25A with either load disconnector 12 or contactors 16 can be significantly cheaper and easier embodiment than the three phase switching devices with circuit breakers used in prior art solutions, e.g. of the type shown in FIG. 2
3. The circuit breaker T2 has three impedances $zd_{aa}$, $zd_{bb}$, $zd_{cc}$ which are connected in parallel to each of the three poles of the circuit breaker.
4. The impedances $zd_{aa}$, $zd_{bb}$, $zd_{cc}$ must meet two requirements, both of which must be met for all types of electrical faults. Firstly, the impedances must limit the short-circuit current to be below the dimensional current of the network. Secondly, the three impedances must be selected so that the resulting negative sequence current at fault condition, is always significantly larger than the negative sequence current which exist during normal operation of a healthy network.
5. The circuit breaker T2 shall be equipped with a control device which detects currents which exceed the dimensional current of the network. In case of too high current, the circuit breaker temporarily opens, and the breaker poles are in off-state, so that the impedances $zd_{aa}$, $zd_{bb}$, $zd_{cc}$ are connected into the main circuit and limits the current, and in addition, creates a significantly large negative sequence current. This is the position shown in FIG. 3. The circuit breaker must be switched off as long as needed by the negative sequence current protection, to clear the fault. The longest time the circuit breaker can be disconnected is most likely determined by the network's voltage quality requirements.
6. The circuit breaker T1 and its relay protection are used as backup protection in case of malfunction of the primary fault clearing, made up by the T2 switching control device and the negative sequence protection. The backup protection for the T1 must therefore be selective against the primary fault clearing based on negative sequence current.

The remaining question to be addressed is whether it is possible to meet the impediment requirements as stated above? The definitive design and sizing of the three impedances will be an engineering balance taking into account a variety of factors, including economy. Below is a simplified reasoning and also four examples which illustrates that it is feasible to fulfill the impedance requirements.

The First Impedance Requirement—to Limit the Fault Current Amplitude

The critical case to check, to limit the short-circuit current to "dimensional current" is to consider a solid three-phase short circuit at the substation bus-bar between the circuit breaker T2 and the feeders A, B . . . N. For simplicity, we assume a directly grounded network. If we make the conservative assumption that the source impedances are small and can be neglected, that is, the impedances of the transformer and the external network are approximately zero, the impedances requirement are $|Zd_{aa}|>|Zk|$  $|Zd_{bb}|>|Zk|$  $|Zd_{cc}|>|Zk|$ The critical impedance is $$|Zk| = \left| \frac{Un}{\sqrt{3} \cdot In} \right| \quad (1)$$

where Un is the nominal main voltage of the network and In is the dimensioning current of the network. The dimensional current can be chosen in different ways. One choice is to select it with regard to the rated current of the components involved. Another choice is to consider the fault clearing time and to dimension with regards to the components' thermal properties. It is also possible to take into account that the power consumption (loss) in the three individual phases might be different and take this in consideration in the dimensioning of the impedances, $zd_{aa}$, $zd_{bb}$, $zd_{cc}$ The Second Impedance Requirements—to Create Negative Sequence Current for all Fault Types The second impedance requirement is that all occurring faults should produce a negative sequence current which is significantly larger than the existing negative sequence currents in a healthy network. One obstacle is that both source impedances and transformer impedance can be unknown, and also the feeder impedances can be uncertain or unknown. One way to make a preliminary dimension of the three damping impedances $zd_{aa}$, $zd_{bb}$, $zd_{cc}$ is to neglect all other impedances in the network, as they are significantly smaller than $zd_{aa}$, $zd_{bb}$, $zd_{cc}$. The preliminarily dimensioned impedances should be checked, so that for all fault types, the negative sequence current must be significantly larger than for a healthy network. This should be checked for critical fault locations which are typically at the remote end of the longest line in the network.

It is a reasonable assumption that in normal operation, the total voltage drop in the network cannot exceed 30% of rated voltage. Otherwise, the network may be incorrectly dimensioned because customers would then get too large voltage variations at varying loads. This suggests that the network impedances are small in relation to the damping impedances $zd_{aa}$, $zd_{bb}$, $zd_{cc}$.

For inefficiently grounded networks, for example coil grounded or isolated neutral, it is sufficient to make short-circuit calculations for three- and two-phase faults. For efficiently grounded networks, calculations should also be made for single phase-to-ground faults and line-line-to-ground fault.

A trivial example is used to illustrate that it is possible to dimension the damping impedances $zd_{aa}$, $zd_{bb}$, $zd_{cc}$. Consider a radial-fed medium voltage network with rated voltage Un=11 kV. The network is fed by a transformer with rated current In=500 A. Other components of the grid are dimensioned to handle this current. In this case, the dimensional current is equal to the rated current. According to equation (1) above, the magnitude of the critical impedances becomes |Zk|≈13 ohm.

The three impedances are complex numbers and have a real part corresponding to resistance, and an imaginary part representing reactance, according to $zd_{aa} = rd_{aa} + j \cdot xd_{aa}$ $zd_{bb} = rd_{bb} + j \cdot xd_{bb}$ $zd_{cc} = r_{cc} + j \cdot xd_{cc}$ An example of a trivial choice is to put all reactances to zero, that is, $xd_{aa} = xd_{bb} = xd_{cc} = 0$, and to choose the three resistances $rd_{aa} = rd_{bb} = |Zk| = 13$ ohm, and $rd_{cc} = 2 \cdot |Zk| = 26$ ohm.

This gives the three damping impedances, $zd_{ac} = 13$ ohm $zd_{bb} = 13$ ohm $zd_{cc} = 26$ ohm For these impedances, the negative sequence current can be calculated, either manually or with computer aids. The current should be calculated for all fault types and critical fault locations in the network. In this way, it can be ensured that for true faults, the negative sequence fault current always significantly exceeds the negative sequence current for a healthy network.

Below are four examples that show how damping impedances can be applied to different types of networks.

Example 1—Coil Grounded 11-kV Network with Resistive Damping Impedances

Consider a coil grounded distribution network according to FIG. 3, with rated main voltage $U_n$=11 kV. The first switching device 25 and other switching device 30 are circuit breakers capable of breaking short circuit currents up to 20 kA. The switching devices for outgoing feeders are vacuum contactors, alternatively load disconnectors with shunt release, with 630 A breaking capacity for currents with a phase angle between −70 to +70 degrees relative to voltage. The rated current of the transformer is 500 A and the maximum load current is 250 A. For all feeders, the maximum load current is 100 A. Negative sequence current during normal operation is less than 20% of load current, which means that for each feeder the highest negative sequence current is 20 A during normal operation.

Each 11 kV feeder connects to several secondary substation transformers which transforms from medium voltage 11 kV to three-phase 400 V that supply electricity to household and industrial consumers. The 400V network has a fault clearing system that disconnects short-circuits, with potentially very high negative sequence currents, within 200 ms. The current amplitude at the 400 V network can be converted to the corresponding current amplitude at 11 kV level, with regard to the transformer's ratio and connection type. Converted to the 11 kV network, the result is that all negative sequence currents larger than 40 A will be disconnected within 200 ms. This information should be used to coordinate the settings of negative-current current protection between the 11 kV and 400 V networks.

Assume that sequence impedances for the feeding network and transformers with impedance grounding are, $zt_0 \approx 600 + j600$ ohm $zt_1 = zt_2 \approx 0.03 + j1.3$ ohm The sequence impedances for longest overhead line, or cable, in the network are $Zl_0 \approx 6 + j4$ ohm $Zl_1 = Zl_2 \approx 2 + j2$ ohm These two impedances give that the network's total zero-sequence and positive-sequence impedances are, $zn_0 = zt_0 + zl_0$ $zn_1 = zt_1 + zl_1$ To determine the criterion to connect the damping impedances, fault current is calculated for two cases where all damping impedances are disconnected. The first case aims at determine the highest short-circuit current, and the second case to find the lowest short-circuit current. Maximum fault current is obtained at a three-phase short circuit directly after the transformer and without any damping impedances. The second case is a two-phase short-circuit at the end of the longest line and without any damping impedances. Any are resistance in the fault location is neglected, but it is also possible to include this in the calculations.

Case 1, the fault current magnitude for a three-phase short circuit directly after the transformer without any damping impedances becomes $$|I_a| = |I_b| = |I_c| = \left|\frac{U_a}{z_{l1}}\right| = \left|\frac{U_n}{\sqrt{3} \cdot z_{l1}}\right| \approx 4884 A$$

Case 2, the fault current magnitude for a two-phase short-circuit at the remote end of the network without any damping impedances becomes $$|I_a| = |I_b| = |I_c| = \left|\frac{U_n}{2 \cdot z_{n1}}\right| = 1420 A$$

The three damping impedances, which are intended to limit the fault current and also introduce un-symmetry, are chosen to be purely resistive. Two of them have the same magnitude, but the third has double magnitude, according to $zd_{aa}$=13 ohm $zd_{bb}$=13 ohm $zd_{cc}$=26 ohm The three phase voltages are given in the unit volts (V), $$U_a = \frac{11000}{\sqrt{3}} \approx 6351$$

$$U_b = a^2 U_a$$

$$U_c = a U_a$$

Inserting these numerical values gives the phase currents in the unit amps (A)

$I_a \approx 391 \angle -2° \quad I_b \approx 372 \angle -142° \quad I_c \approx 265 \angle -112°$ Conversion to symmetrical components gives $I_0 \approx 0 \quad I_1 \approx 339 \angle -11° \quad I_2 \approx 75 \angle +40°$ Similarly, the fault currents can be calculated for all two-phase shortcuts and one-phase earth fault in accordance with Appendix A. The calculations for the most important fault types are summarized in the table below. The numbers in the table are rounded. The notations used for "fault type" are in accordance with US (ANSI) standard.

TABLE 1

Currents with connected damping impedance for different fault types with fault location at the remote end of the longest line in the network. Applies to Example 1 which is 11 kV impedance-grounded network with resistive damping impedances. All currents are given in amps (A) and angles are given in degrees. All faults are calculated with zero resistance at the fault location

| Fault type | $I_a$ | $I_b$ | $I_c$ | $I_0$ | $I_1$ | $I_2$ |
|---|---|---|---|---|---|---|
| a-b-c | 391 ∠− 2° | 372 ∠− 142° | 265 ∠+ 112° | 0 | 339 ∠− 11° | 75 ∠+ 40° |
| a-b | 357 ∠+ 18° | 357 ∠− 162° | 0 | 0 | 206 ∠− 12° | 206 ∠+ 48° |
| b-c | 0 | 253 ∠− 99° | 253 ∠+ 81° | 0 | 146 ∠− 9° | 146 ∠+ 171° |
| c-a | 253 ∠− 39° | 0 | 253 ∠+ 142° | 0 | 146 ∠− 9° | 146 ∠− 69° |
| a-g | 21.3 ∠− 43° | 0 | 0 | 7.1 ∠− 43° | 7.1 ∠− 43° | 7.1 ∠− 43° |
| b-g | 0 | 21.3 ∠− 163° | 0 | 7.1 ∠− 163° | 7.1 ∠− 43° | 7.1 ∠+ 77° |
| c-g | 0 | 0 | 20.7 ∠+ 78° | 6.9 ∠+ 78° | 6.9 ∠− 42° | 6.9 ∠− 162° |

The maximum short-circuit current with connected damping impedances is given for a three-phase short circuit directly after the transformer. The purpose of this calculation is to find the longest fault clearing time and check that the feeder switching devices are capable of breaking this currents. Calculations according to Appendix A gives that the current magnitude will be $|I_a|$=450 A $|I_a|$=439 A $|I_a|$=292 A All phase currents are below the rated current breaking capacity of the feeder switching devices. This indicates the damping impedances will limit the fault current to a magnitude, so that the feeder switching devices are able to disconnect the fault.

The next step is to calculate the currents for different fault types at the far end of the network. The purpose of this calculation is to make sure that we either get a negative sequence current or a significant zero-sequence current that exceeds the current magnitudes for a healthy network so that we can use protection based on negative or zero sequence current. We start with calculations for a three-phase short-circuit at the far end of the network. According to Appendix A, the phase currents are given by the equations (A38), (A39), (A40).

Table 1 shows that for two- and three-phase short-circuits, a negative sequence current is always obtained. The minimum magnitude is obtained for three-phase short-circuiting, which gives 75 A. This magnitude is significantly larger than the feeder's maximum negative sequence current during normal operation, which, according to the assumptions, was 20 A. Therefore, the connection of the un-symmetric damping impedances during faults, enables the use of negative sequence current protection for all fault types. Specifically, it can be used when earth fault protection does not work, that is, when the zero sequence current is zero, $I_0$=0.

The uniqueness with the method of using un-symmetrical damping impedances, is that a negative-sequence current is also created for three-phase short-circuits, which enables that negative sequence protection can be used for all types of short circuits including those without any ground connection.

It should be noted that some short circuits in the underlying 400V network can result in high negative sequence current which can be seen on the 11 kV side of the secondary substation transformers. The operation of the fault clearing in the 400 kV network can be converted to the 11 kV side, and at 11 kV this corresponds to that negative sequence currents above 40 A will be disconnected faster than 200 ms.

The non-directional negative sequence current protection for the 11 kV feeder need to be selective against the underlying 400 V network. Therefore the 11 kV protection need to be set with a margin toward 40 A and 200 ms. Therefore, a possible setting for the 11 kV feeders can be a 44 A pickup value (start) of negative sequence current and a trip time delay of 500 ms.

To prevent activation of the damping impedances when the network is healthy, the setting of the activation limit for the damping impedances should be chosen to be larger than normal load currents and also include some margin against transformer's inrush currents. In order for the damping impedances to be surely activated during short circuits, the limit should be less than the minimum short circuit current. In this example, the transformer rated current is 500 A, and the minimum short circuit current is 1420 A. Therefore, the criterion is chosen: "if any phase current exceeds 1000 A, then the damping impedances are activated by switching off the switch T2. Damping impedances are deactivated after 1 second by switching on the switch T2."

Most likely the 11 kV feeders also need protection against overload. It is important that the operating area of the overload protection is limited so that it is only active if all phase currents are below rated data of the switching equipment. There are at least two ways to do this. One way is to block the operation of the switching equipment if the current exceeds rated breaking capacity. The second is that the overload protection ignores currents which exceed a settable limit. In digital relay protection, it is straightforward to implement as a simple logical condition, typically Matlab pseudo code may look like,

TEXTBOX 1

Matlab-pseudokod to limit the operation area of the overload protection.

```
LimitI=630; % A
MaxI=max(abs(Ia),abs(Ib),abs(Ic))
if MaxI ∠ LimitI
    I_relay=MaxI;
else
    I_relay=0;
End
RunRelayFunction(I_relay)
```

The transformer's regular circuit breaker T1 should be equipped with overcurrent protection and also protection against overload. The purpose of the T1 overcurrent protection is to be backup protection for missing function of T2 and the relay protection for the outgoing feeders. Therefore, the T1 overcurrent protection must be selective against the setting for activating the T2 damping impedances. The regular circuit breaker T1 should also have an inverse time overload protection which protects for overloads up to the operation zone for switching of T2 damping impedance.

Example 2—Coil Grounded 11 kV Network Having Damping Impedances with Equal Magnitudes but Different Phase Angles Consider a coil grounded distribution network according to FIG. 3, with rated main voltage $U_n=11$ kV. The switching devices T1 and T2 are circuit breakers capable of breaking short circuit currents up to 20 kA. The feeders' switching devices are vacuum contactors, alternatively load disconnectors with shunt release. The feeders' switching devices have current breaking capacity of 630 A for currents with a phase angle between −50 to +50 degrees relative to the voltage. The rated current of the transformer is 1000 A and its maximum load current is 800 A. For all feeders, the maximum load current is 200 A. Negative sequence currents during normal operation are less than 20% of the load current, which means that for each feeder the highest negative sequence current at normal operation is 40 A.

Each 11 kV feeder connects to several secondary substation transformers which transform medium voltage 11 kV to three-phase 400 V that supply electricity to household and industry. The underlying 400V network has a fault protection system which clears short circuits with very large amplitudes of negative sequence current within 200 ms. The current at the 400 V level can be converted to the corresponding current at the 11 kV level, taking into account the transformer's ratio and coupling type. Converted to the 11 kV network, the result is that any negative sequence current larger than 40 A will be disconnected within 200 ms. This information should be used to coordinate the negative-sequence current protection between the 11 kV and 400 V networks.

Assume that the impedances for the feeding network and transformers with impedance grounding, given in symmetrical components, are $$zt_0 \approx 300+j300 \text{ ohm} \quad zt_1=zt_2 \approx 0.01+j0.65 \text{ ohm}$$

The impedance for longest overhead line, or cable, in the network is $$Zl_0 \approx 4+j3 \text{ ohm} \quad Zl_1=Zl_2 \approx 1.5+j1.5 \text{ ohm}$$

These two impedances give the network's total zero-sequence and positive-sequence impedance, $$zn_0=zt_0+zl_0$$

$$zn_1=zt_1+zl_1$$

To find the condition for activation of the damping impedances, the fault current is calculated for two cases without any damping impedances connected. The first case aims at determining maximum short-circuit current and the second to find the lowest short-circuit current. Maximum fault current is obtained for a three-phase short-circuit directly after the transformer and without any damping impedances. The second case is a two-phase short-circuit at the end of the longest line and without any damping impedances. Any arc resistance in the fault location is neglected, but it is also possible to include this in the calculations.

Case 1, the fault current magnitude for a three-phase short circuit directly after the transformer without any damping impedances becomes $$|I_a|=|I_b|=|I_c|=\left|\frac{U_a}{zt_1}\right|=\left|\frac{U_n}{\sqrt{3}\cdot zt_1}\right| \approx 9769 \text{ A}$$

Case 2, the fault current magnitude for a two-phase short-circuit at the remote end of the network without any damping impedances becomes $$|I_a|=|I_b|=|I_c|=\left|\frac{U_n}{2\cdot zn_1}\right|=2093 \text{ A}$$

The three damping impedances, which should limit the fault current, and also introduce unsymmetrical current, are chosen to have the same magnitude but different phase angles. The phase angles of the three damping impedances are chosen to be the respective angles, 0, +45 and −45 degrees, which can be written $$zd_{aa} = 25 \angle 0° = 25\exp(j \cdot 0) = 25 \text{ ohm}$$

$$zd_{bb} = 25 \angle + 45° = 25 \cdot \exp\left(j\frac{\pi}{4}\right) = 25 \cdot \left(\frac{1}{\sqrt{2}} + j\frac{1}{\sqrt{2}}\right) \text{ ohm}$$

$$zd_{cc} = 25 \angle - 45° = 25 \cdot \exp\left(-j\frac{\pi}{4}\right) = 25 \cdot \left(\frac{1}{\sqrt{2}} - j\frac{1}{\sqrt{2}}\right) \text{ ohm}$$

The maximum short-circuit current with connected damping impedances is achieved for a three-phase short circuit directly after the transformer. The purpose of this calculation is to be able to dimension the longest time for fault clearing and check that the feeder switching equipment is capable of breaking its currents. Calculations according to Appendix A give the current magnitudes $|I_a|=351$ A $|I_a|=219$ A$|I_a|=225$ A All phase currents fall below the maximum current breaking capacitive for the feeders' switching devices. This shows that the damping impedances will limit the fault current, so that the fault can be cleared by using the low budget feeder switching devices. The next stage is to calculate phase currents for different fault types at the far end of the network. The purpose of this calculation is to check that a significantly large negative sequence current, or zero sequence current, is present. The magnitude must exceed that for a healthy network, so that protection based on negative or zero sequence currents can be used.

In the same way as in the previous example, the current magnitude of different fault field types are calculated at the remote end of the network, in accordance with Appendix A.

seen on the 11 kV side. The functionality of fault clearing system in the 400 V network can be converted to the 11 kV side. At 11 kV this corresponds to that negative sequence fault currents with magnitude exceeding 40 A are disconnected faster than 200 ms.

The negative-sequence current protection of the 11 kV feeders need to be selective against faults in the underlying 400 V networks, therefore they should be set with a margin to 40 A and 200 ms. Therefore, a possible setting for the non-directional negatives sequence protection for all 11 kV feeders can be a pickup value (start) for negative sequence current amplitudes which exceeds 44 A and use a timer with a delay time of 500 ms.

We can also introduce a "fast-stage" for the non-directional negative-sequence current protection for the 11 kV feeders. The fast stage (step) can be set to 80 A negative sequence current magnitude and with a time delay of 100 ms. The fast stage is only enabled under certain logical conditions. One possibility is to only enable the fast stage when the damping impedances are activated, for example by using the breaker position for T2. Another option is to only enable the fast stage for a limited time, for example 2 seconds, if any of the feeder phase currents amplitudes exceeds the threshold used to enable the damping impedances.

In order to avoid activation of the damping impedances when the network is healthy, the current limit for activation of the damping impedances should be chosen to be above normally occurring load currents and also include some

TABLE 2

Currents with connected damping impedances for different field types, with fault location at the remote end of longest line in the network. Applies to Example 2 which is 11 kV impedance-grounded network with damping impedances with equal magnitude but different phase angles. All currents are given in amps (A) and angles are given in degrees. All fault currents are calculated without any resistance at the fault location

| Fault type | $I_a$ | $I_b$ | $I_c$ | $I_0$ | $I_1$ | $I_2$ |
|---|---|---|---|---|---|---|
| a-b-c | 329 ∠− 5° | 205 ∠− 144° | 221 ∠+ 137° | 0 | 243 ∠− 4° | 87 ∠− 9° |
| a-b | 217 ∠+ 4° | 217 ∠− 176° | 0 | 0 | 125 ∠− 26° | 125 ∠+ 34° |
| b-c | 0 | 285 ∠− 96° | 285 ∠+ 84° | 0 | 165 ∠− 6° | 165 ∠+ 174° |
| c-a | 231 ∠− 14° | 0 | 231 ∠+ 166° | 0 | 133 ∠+ 16° | 133 ∠− 44° |
| a-g | 39.0 ∠− 39° | 0 | 0 | 13.0 ∠− 39° | 13.0 ∠− 39° | 13.0 ∠− 39° |
| b-g | 0 | 37.5 ∠− 165° | 0 | 12.5 ∠− 165° | 12.5 ∠− 45° | 12.5 ∠+ 75° |
| c-g | 0 | 0 | 43.2 ∠+ 85° | 14.4 ∠+ 85° | 14.4 ∠− 35° | 14.4 ∠− 155° |

Table 2 shows that for two- and three-phase short-circuits, a negative sequence current is always obtained. The minimum magnitude occurs for three-phase short-circuiting which gives 87 A. This magnitude is significantly larger than the feeder's maximum negative sequence current at normal operation. Therefore, the connection of the un-symmetric damping impedances enables negative-sequence protection for the fault types where earth fault protection is not working, that is, when the zero-sequence current is zero, $I_0=0$. The uniqueness with the method of using un-symmetrical damping impedances, is that it also creates a negative-sequence current for three-phase short-circuits, which enables negative-sequence protection to be used for all types of short circuits without any ground connection We need to consider that some short circuits in the underlying 400V network can give high current amplitudes which produce a high negative sequence current that can be margin against the transformer's inrush currents. In order for the damping impedances to be surely activated during short circuits, the limit should be less than the lowest short circuit current in the network. In this example, the transformer rated current is 1000 A, and the minimum short-circuit current without any damping impedances connected is 2093 A. Therefore, the criterion is chosen: "If any phase current exceeds 1500 A, then the damping impedances are activated by switching the breaker-T2 off. Damping impedances are deactivated after 1 second by switching on breaker T2." Probably, 11 kV feeders also need overload protection which can be implemented in a similar manner to Example 1.

The transformer's regular breaker T1 should be equipped with overcurrent protection and also protection against overload. The purpose of the T1 overcurrent protection is to be a back-up protection for failure in T2's protection. Therefore, the T1 overcurrent protection must be selective against the setting used to activate T2's damping impedances. The regular breaker T1 should also have overload protection with operation range from maximum permissible load current up to the start value to activate T2's damping impedances.

Example 3—Directly Grounded 400V Network, Damping Impedances with Equal Magnitudes but Different Phase Angles Consider a directly grounded industrial network according to FIG. 3, with rated main voltage $U_n$=400 V. The switching devices T1 and T2 are breakers capable of interrupting short circuit currents up to 20 kA. The feeders' switching devices are contactors, or alternatively load disconnectors with shunt release, which has 630 A maximum currents interruption capacity for phase angles between −70 to +70 degrees relative to the voltage.

The transformer's rated current is 200 A and its maximum load current is 200 A. For all feeders, the maximum load current is 64 A. The negative sequence current during normal operation is less than 25% of load current, which means that for each feeder the highest negative sequence current is 16 A at normal operation. Assume that source impedance for feeding networks and the transformer with direct grounding, given in symmetrical components, are $zt_0 \approx 2.0+j0.1$ ohm $zt_1=zt_2\approx 0.003+j0.07$ ohm The impedance for longest overhead line, or cable, in the network is $Zl_0 \approx 0.5+j0.2$ ohm $Zl_1=Zl_2\approx 0.2+j0.1$ ohm These two impedances give the network's total zero-sequence and positive-sequence impedance, $zn_0=zt_0+zl_0$ $zn_1=zt_1+zl_1$ To determine the criterion to activate of the damping impedances, then we need to calculate fault current for two cases without any damping impedances. The first case aims at determining the highest short-circuit current and the second to find the smallest short-circuit current. Maximum fault current is obtained at a three-phase short circuit directly after the transformer and without any damping impedances.

$$|I_a|=|I_b|=|I_c|=\left|\frac{U_a}{zt_1}\right|=\left|\frac{U_n}{\sqrt{3}\cdot zt_1}\right|\approx 3296\ A$$

Case 2, the fault current magnitude for a two-phase short-circuit at the end of the longest feeder, without any damping impedances connected, becomes $$|I_a|=|I_b|=|I_c|=\left|\frac{U_n}{2\cdot zn_1}\right|=755\ A$$

The three damping impedances, which should limit the fault current and also introduce unsymmetrical current, are chosen to have the same magnitude but different phase angles. The phase angles of the three damping impedances are selected to be 0, +60 and −60 degrees, respectively, which can be written as $$zd_{aa}=1.5\angle 0° = 1.5\exp(j\cdot 0)=1.5\ \text{ohm}$$

$$zd_{bb}=1.5\angle +60° = 1.5\cdot \exp\left(j\frac{\pi}{3}\right)=1.5\cdot\left(\frac{1}{2}+j\frac{\sqrt{3}}{2}\right)\ \text{ohm}$$

$$zd_{cc}=1.5\angle -60° = 1.5\cdot \exp\left(-j\frac{\pi}{3}\right)=1.5\cdot\left(\frac{1}{2}-j\frac{\sqrt{3}}{2}\right)\ \text{ohm}$$

The maximum short-circuit current with connected damping impedances occurs for a three-phase short circuit directly after the transformer. The purpose of this calculation is to be able to dimension the longest time for fault clearing. Calculation according to Appendix A, results in the current magnitudes $|I_a|$=231 A $|I_b|$=128 A $|I_c|$=139 A In the same way as in the previous example, the currents are calculated for different fault types at the remote end of the longest feeder in accordance with Appendix A.

TABLE 3

Currents with connected damping impedance for different fault types, with fault location at the remote end of longest line of the network. Applies to Example 3 which is 400 V, direct-grounded net with damping impedances that have the equal magnitude but different phase angles. All currents are given in amps (A) and angles are given in degrees. All faults are calculated without any resistance in the fault location

| Fault type | $I_a$ | $I_b$ | $I_c$ | $I_0$ | $I_1$ | $I_2$ |
|---|---|---|---|---|---|---|
| a-b-c | 202 ∠− 6° | 116 ∠− 147° | 133 ∠+ 140° | 0 | 143 ∠− 4° | 59 ∠− 12° |
| a-b | 128 ∠− 2° | 128 ∠+ 178° | 0 | 0 | 74 ∠− 32° | 74 ∠+ 28° |
| b-c | 0 | 207 ∠− 100° | 207 ∠+ 80° | 0 | 119 ∠− 10° | 119 ∠+ 170° |
| c-a | 142 ∠− 10° | 0 | 142 ∠+ 170° | 0 | 82 ∠+ 20° | 141 ∠− 40 |
| a-g | 93 ∠− 5° | 0 | 0 | 31 ∠− 5° | 31 ∠− 5° | 31 ∠− 5° |
| b-g | 0 | 102 ∠− 161° | 0 | 34 ∠− 161° | 34 ∠− 41° | 34 ∠+ 79° |
| c-g | 0 | 0 | 114 ∠+ 152° | 38 ∠+ 152° | 38 ∠+ 32° | 38 ∠− 88° |

The second case is a two-phase short circuit at the end of the longest feeder and without any damping impedances. Any arc resistance in the fault location is neglected, but it is also possible to include this in the calculations.

Case 1, the fault current magnitude for a three-phase short circuit directly after the transformer without any damping impedances connected becomes Table 3 shows that for two- and three-phase short-circuits, a negative sequence current is always obtained. The minimum magnitude occurs for three-phase short-circuit, which gives 59 A. This magnitude is significantly larger than the highest negative sequence current for a healthy network which is 16 A. Therefore, the connection of the un-symmetrical damping impedances enables that negative sequence protection can be used for all fault types, in particular for those fault types which lacks zero sequence current, that is $I_0=0$.

A suitable setting for the non-directional negative sequence current protection for all 400V feeder may to set a pickup (start) value of 32 A and use a timer with a very short time delay, for example 20 ms.

In order to avoid erroneous activation of the damping impedances when the network is healthy, the current limit for activation should be above all normally occurring load currents and also include a margin against transformer inrush currents. In order for the damping impedances to be surely activated during short circuits, the limit should be less than the minimal short circuit current. In this example, the transformer rated current is 200 A, and the minimum short-circuit current without any damping impedances connected is 755 A. Therefore, the criterion is chosen to be: "If any phase current exceeds 450 A, then the damping impedances are activated by switching off the breaker-T2. Damping impedances are deactivated after 1 second by switching on the breaker T2."

Most likely the 400V feeders also need a overload protection which can be implemented in a similar manner as in Example 1 and Example 2 above.

The transformer's regular breaker T1 should be equipped with overcurrent protection and also overload protection. The purpose of the T1 overcurrent protection is to be backup protection for non-functioning of T2's protection. Therefore, the T1 overcurrent protection must be selective against the setting to activation of T2's damping impedances. The regular breaker T1 should also have overload protection with a current range that covers the range from maximum permissible load current up to the settings to activate T2's damping impedances.

Figure 4:
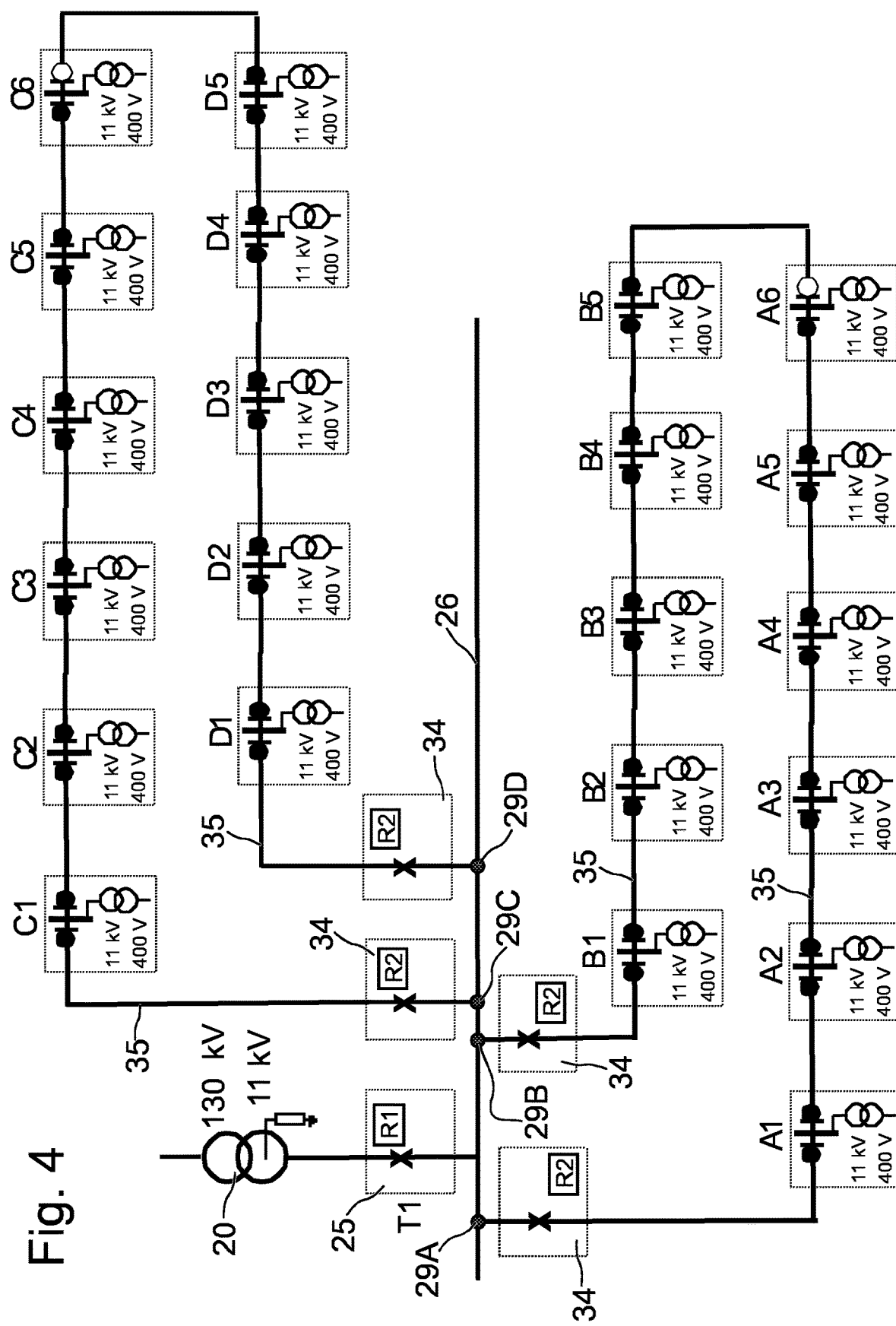
FIG. 4 shows a single-line diagram (the three phases are represented by a common line) which illustrates how prior art is typically applied to a transformer station with 130 kV to 11 kV, with four output feeders. Also shown are associated secondary substations, which transform from 11 kV to 400 V.
Figure 5:
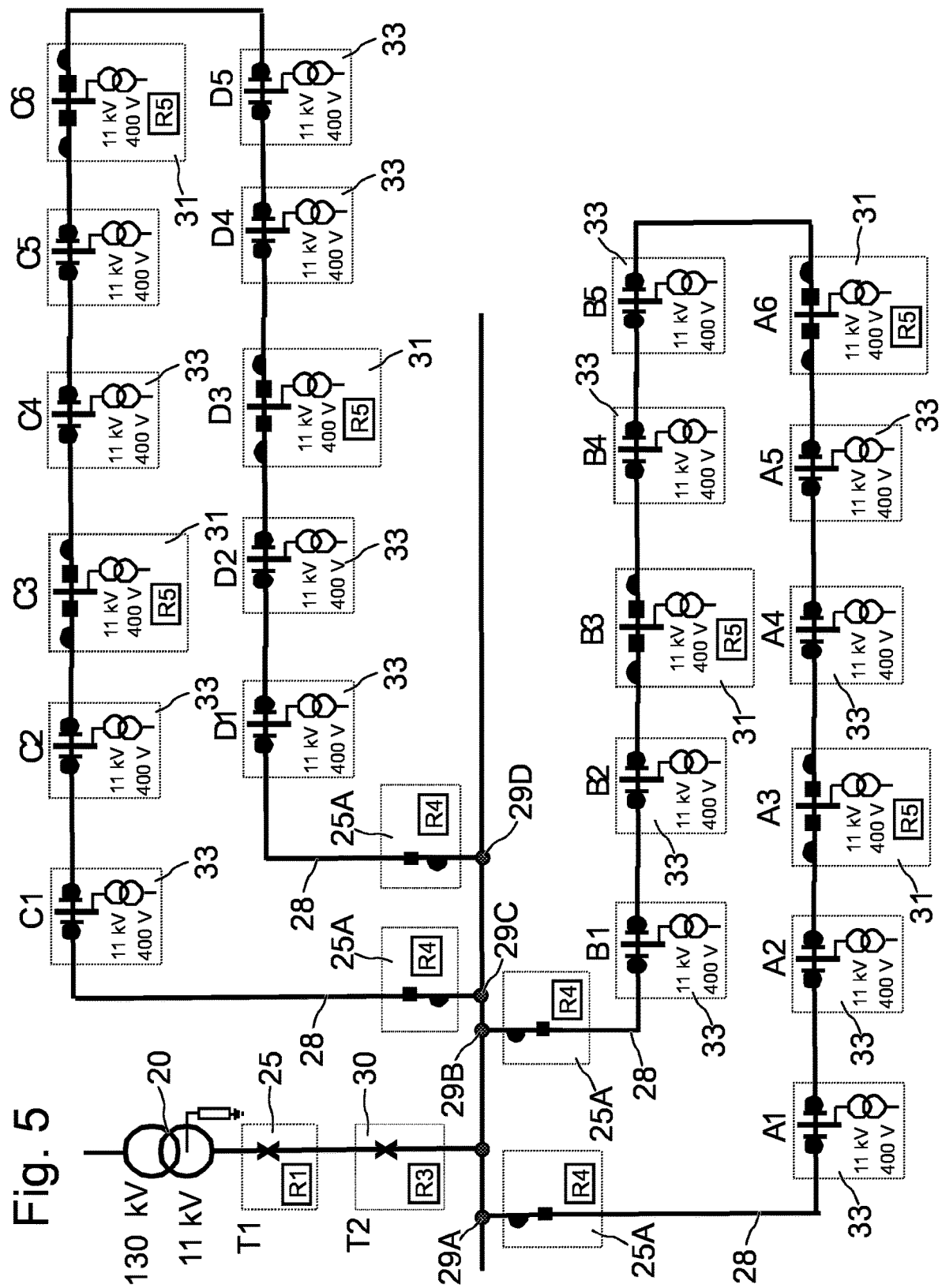
FIG. 5 shows a single-line diagram utilizing an embodiment of the new technology in the present invention for a transformer station of 130 kV to 11 kV with four feeders, also shown are the associated secondary substations which transform from 11 kV to 400 V.

Example 4—Ring-Feed 11 kV Coil Grounded Network Using Damping Impedances with Equal Magnitude but Different Phase Angles The purpose of this example is to illustrate how the invention can be applied to reduce the interruption time of a coil grounded 11 kV network, typically used in Sweden. FIG. 4 shows traditional prior art for a 11 kV network with four feeders 29, with associated traditional switching devices 34, such as load disconnectors, but without any protection. FIG. 5 shows new technology according to the invention which can be used to reduce the interruption time in the same network. To illustrate the advantages, the invention according to FIG. 5 is compared with the traditional technique of FIG. 4, whereby interruption time and non-delivered energy are calculated and compared.

The assumptions for both networks according to FIGS. 4 and 5 are that according to statistic based on several years, each feeder has in average two permanent faults per year. Each permanent fault causes one-hour interruption time. The average load current for each secondary substation is 21 A, calculated at the 11 kV level, which corresponds to the power $$P=\sqrt{3}\cdot 11\cdot 10^3\cdot 21\approx 400 \text{ kW}$$

On average, each customer uses approximately 2 kW, which means that each secondary substation supplies around 200 customers with electricity. For each feeder, the expected value of non-delivered energy per year (E) can be calculated according to formula $$E=n\cdot P\cdot k\cdot t$$

where n is the number of secondary substations per feeder, P is the average power per secondary substation, k is the average number of permanent faults per year and feeder, and t is the average interrupt time per fault.

For the conventional power grid of FIG. 4, the fault clearing use two variants of relay protection with notations R1 and R2. The variant R1 is used for the infeed from the transformer and consists of two-stage overcurrent protection, where stage 1 has invert-time characteristics which primarily protect against overload and step 2 has constant-time characteristic which aims to protect against short circuits.

In addition, R1 has neutral-voltage protection that protects for earth fault and is also backup protection for mal-operation of the feeder earth fault protection. Relay protection of variant R2 are used for the four feeders and consists of a directional earth fault protection and a two-stage overcurrent protection of the same type as R1, but with a different setting.

The traditional network of FIG. 4, with the relay protection of variants R1 and R2, works so that a permanent fault at a feeder will result in disconnection of all secondary sub-stations connected to the feeder. For feeder 29A and 29C, which has six secondary substations, the expected value of non-delivered energy (E) becomes.

$$E_A=E_C=6\cdot 400\cdot 2\cdot 1=4800 \text{ kWh}$$

For feeders 29B and 29D which each have five secondary substations, the corresponding expected values are $$E_B=E_D=5\cdot 400\cdot 2\cdot 1=4000 \text{ kWh}$$

For the entire grid, the expected value of the total annual non-delivered energy ($E_N$) is $$E_N=E_A+E_B+E_C+E_D=17600 \text{ kWh}$$

We continue to consider FIG. 5 which shows how the network can be improved by applying the invention. A comparison between the networks FIG. 4 and FIG. 5 shows the following changes in FIG. 5:

1. For the infeed from the transformer, a new circuit breaker T2 with damping impedances has been introduced together with relay protection of variant R3;
2. For all four feeders, the circuit breakers have been replaced with contactors with shunt tripping from new relay protection according to variant R4;
3. In every third secondary substation, load disconnectors have been replaced with contactors with shunt trip from new relay protection according to variant R5;
4. In the secondary substations A6 and C6, the loop has been closed, which means that two feeders previously driven as radians have now been merged and operates as one closed loop, that is, ring fed from two feeders.

The dimensioning of the damping impedances and rated data follows Example 2, as above, and therefore is not repeated. The important thing in this example is the new variants of relay protection.

The relay protection as variant R3 works in principle according to Example 2. If the current magnitude exceeds the set limit value, the damping impedances are activated by switching off breaker T2, but the time duration of activation is longer. In this case, the damping impedances are activated for 1.2 seconds.

The relay protections of the four feeders are as variant R4, which includes a directional earth-fault protection with a constant-time characteristic and a directional negative sequence current protection. If the fault current exceeds the contactor's rated data, the relay protection according to variant R4 is blocked and does not give any trip signal.

In the embodiment shown in FIG. 5, every third secondary substation is a special variant of secondary substation 31, which has contactors with shunt release controlled by a relay protection of the variant R5. This variant includes two directional earth fault protection with constant-time characteristic and two directional negative sequence current protections with constant-time characteristic. For the two protection functions of the same type, one is directed backwards at the secondary substation with lower index, and the other is directed forward at the secondary substation with higher index.

The same principle applies to the secondary substations used to close the ring fed loop. Directional negative sequence protection is described in literature and various patents, e.g. EP0316203B1, and therefore this is considered to be the prior art which need not be further described. The relay protection according to variant R5 is blocked and gives no trip signal if the current exceeds the contactor's rated data. The relay protection settings for variant R4 and variant R5 are made so that selective fault clearing is achieved for the ring-fed loop made by feeder-pairs 29A-29B and 29C29D.

For the directional earth fault protection, this implies that all protection functions are set at the same current value, typically 1 A resistive component. For the directional negative-sequence current protection, all protection functions are set to the same current value, typically according to Example 2, pickup value (start) if the negative sequence current magnitude exceeds 44 A.

Assume that the time delay setting for variant R1's neutral voltage protection, (backup protection), is 3.5 s. The timer setting of the directional earth fault protections are done as follows:
  For the four feeders 29A, 29B, 29C, 29D, the time delay is $T_\delta$=2.4 s
  For the four special version secondary substations, 31, with notations A3, B3, C3, D3 with direction towards lower substation index $T_\alpha$=1.5 s; and for direction towards higher substation index $T_\gamma$=2.1 s
  For the two secondary substations, 31, with notations A6, C6, the timer setting for both protection functions are $T_\beta$=1.8 s Assume that all faults in the underlying 400V network, which produces negative sequence current above the pickup value of negative sequence current protection in the secondary substations, are disconnected within 200 ms. The time delays for the directional negative sequence protections are chosen as follows:
  For the four feeders 29A, 29B, 29C, 29D, the time delay is $T_4$=0.9 s.
  For the four special variant secondary substations 31 with notations A3, B3, C3, D3 with direction at lower index, the time delay is $T_1$=0.3 s; and for direction towards higher index, $T_3$=0.7 s.
  For the two, secondary substations 31 with notations A6, C6 the time delay for both protection functions are $T_2$=0.5 s.

The functionality of the new network, according to the invention, in FIG. 5 implies that for permanent fault in the network, only two secondary substations are disconnected. In total for the four feeders, one can expect eight faults per year. The expected value for non-delivered energy (E) can be calculated as $$E_N = 2 \cdot 400 \cdot 8 \cdot 1 = 6400 \text{ kWh}$$

This means that the expected value of non-delivered energy drops from 17,600 kWh down to 6400 kWh. With the new technology as suggested in the invention, non-delivered energy is reduced by 11200 kWh.

The relation between the expected value of non-delivered energy for the two different networks becomes $$\eta = \frac{E_N^{Fig5}}{E_N^{Fig4}} = \frac{6400}{17600} \approx 0.36$$

The advantage is that by using the invention, a new network solution can be used which reduce customer's interruption time and non-delivered energy by 74%. In the presented example, the non-delivered energy is reduced by 11 200 kWh. If societies cost for non-delivered energy is assumed to be SEK 30 per kWh, then the interruption cost for society be reduced by SEK 336,000 per year for one local network. This indicates the usefulness of the invention. The additional network components required are relay protection and contactors in six secondary substations, as well as damping impedances. The network components reduced are three circuit breakers which are saved.

APPENDIX A—FAULT CURRENT CALCULATION WHEN USING DAMPING IMPEDANCES

At all calculations of fault currents, load currents are neglected. In order to take into account the effect of possible load currents, they can subsequently be added to the calculated currents.

APPENDIX A, Part 1—THREE-PHASE SHORT CIRCUIT

Consider a three-phase short circuit without ground connection at the remote end of a network line. Let $U_a$, $U_b$, och $U_c$ be the phase voltages for the feeding source and $U_f$ is the voltage at the fault location. The equations at the fault location are $$\begin{pmatrix} U_a \\ U_b \\ U_c \end{pmatrix} = Zf_{abc} \begin{pmatrix} I_a \\ I_b \\ I_c \end{pmatrix} + \begin{pmatrix} 1 \\ 1 \\ 1 \end{pmatrix} U_f \quad (A1)$$

where $Zf_{abc}$ is the total impedance matrix which includes both the impedances of the network and the switchable damping impedances. The task is to calculate the phase currents $I_a$, $I_b$, och $I_c$, given known values for other parameters and variables.

Note that the impedance matrix uses phase quantities, as shown by the index abc. The nine elements in the matrix $Zf_{abc}$ consist of up to four different elements, three of which are the diagonal elements and one common element for the other non-diagonal elements, according to $$Zf_{abc} = \begin{pmatrix} zf_{aa} & zf_{ab} & zf_{ab} \\ zf_{ab} & zf_{bb} & zf_{ab} \\ zf_{ab} & zf_{ab} & zf_{cc} \end{pmatrix} \quad (A2)$$

The voltage at the fault location is eliminated by writing the equations for $U_a-U_b$ and $U_b-U_c$ which gives $$U_{ab} = (zf_{aa} - zf_{ab})I_a + (Zf_{ab} - zf_{bb})I_b \quad (A3)$$

$$U_{bc} = (zf_{bb} - zf_{ab})I_b + (Zf_{ab} - zf_{cc})I_c \quad (A4)$$

The notations for main voltages are $U_{ab}=U_a-U_b$ and $U_{bc}=U_b-U_c$. Since the fault location does not have any ground connection, then $I_c=-I_a-I_b$, which is used to eliminate $I_c$ and results in $$U_{ab}=(Zf_{aa}-zf_{ab})I_a+(Zf_{ab}-Zf_{bb})I_b \quad (A5)$$

$$U_{bc}=(zf_{cc}-zf_{ab})I_a+(zf_{bb}+zf_{cc}-2\cdot zf_{ab})I_b \quad (A6)$$

The next step is to replace the four elements in $Zf_{abc}$ with the network impedances and damping impedances. The damping impedances $zd_{aa}$, $zd_{bb}$ and $zd_{cc}$ can be selected individually and can be different. On the other hand, the diagonal element for the network impedances are identical and has the notation $zn_{aa}$. The diagonal elements in $Zf_{abc}$ can therefore be written as $$zf_{aa}=zd_{aa}+zn_{aa} \quad (A7)$$

$$zf_{bb}=zd_{bb}+zn_{aa} \quad (A8)$$

$$zf_{cc}=zd_{cc}+zn_{aa} \quad (A9)$$

The off-diagonal elements are identical and depend only on the impedance of the network $$zf_{ba}=zn_{ba} \quad (A10)$$

which gives $$U_{ab}=(zn_{aa}-zn_{ab}+zd_{aa})I_a-(zn_{aa}-zn_{ab}+zd_{bb})I_b \quad (A11)$$

$$U_{bc}=(zn_{aa}-zn_{ab}+zd_{cc})I_a+(zd_{bb}+zd_{cc}+2(zn_{aa}-zn_{ab}))I_b \quad (A12)$$

We like to express the network impedances in symmetrical components, rather than phase quantities. For the network impedances we use that $$zn_{aa}=\tfrac{1}{3}(zn_0+2\cdot zn_1) \quad (A13)$$

$$zn_{ab}=\tfrac{1}{3}(zn_0-zn_1) \quad (A14)$$

which results in $$zn_{aa}-zn_{ab}=zn_1 \quad (A15)$$

The two equations come $$U_{ab}=(zn_1+zd_{aa})I_a-(zn_1+zd_{bb})I_b \quad (A16)$$

$$U_{bc}=(zn_1+zd_{cc})I_a+(zd_{bb}+zd_{cc}+2\cdot zn_1)I_b \quad (A17)$$

This is written on matrix form $$\begin{pmatrix} U_{ab} \\ U_{bc} \end{pmatrix} = \begin{pmatrix} z_\alpha & -z_\beta \\ z_\gamma & z_\delta \end{pmatrix} \begin{pmatrix} I_a \\ I_b \end{pmatrix} \quad (A18)$$

The used notations for the matrix elements are $$z_\alpha=(zn_1+zd_{aa}) \quad (A19)$$

$$z_\beta=(zn_1+zd_{bb}) \quad (A20)$$

$$z_\gamma=(zn_1+zd_{cc}) \quad (A21)$$

$$z_\delta=(2\cdot zn_1+zd_{bb}+zd_{cc}) \quad (A22)$$

The equation system has a unique solution if the determinant d is non-zero. The determinant is $$d=z_\alpha z_\delta+z_\beta z_\gamma \quad (A23)$$

Therefore, it is investigated if it is possible that the determinant can be zero. The determinant can be written as $$d=(zn_1+zd_{aa})(2\cdot zn_1+zd_{bb}+zd_{cc})+(zn_1+zd_{bb})(zn_1+zd_{cc}) \quad (A24)$$

For the determinant to be zero, d=0, then it is required that:

$$zn_1+zd_{aa}=0 \text{ and also that } zn_1+zd_{bb}=0 \quad (A25)$$

or $$zn_1+zd_{ac}=0 \text{ and also that } zn_1+zd_{bb}=0 \quad (A26)$$

or $$zn_1+zd_{bb}=0 \text{ and also that } zn_1+zd_{cc}=0 \quad (A27)$$

Is it possible to fulfill any of these conditions to get a zero determinant? Suppose the network positive sequence impedance is $zn_1=rn_1+jxn_1$. To nullify this network impedance, the damping impedances need to be selected as $$zd_{aa}=zd_{bb}=-zn_1=-rn_1-jxn_1 \quad (A28)$$

It is possible to select damping impedances with a capacitive part which gives a negative reactance. However, it is impossible to choose a passive component that has negative resistance, that is, $-rn_1$. Therefore, it is impossible to fabricate a case which results in a zero determinant. This means that the equations for phase currents always have a unique solution.

The phase currents becomes $$\begin{pmatrix} I_a \\ I_b \end{pmatrix} = \frac{1}{d}\begin{pmatrix} z_\delta & z_\beta \\ -z_\gamma & z_\alpha \end{pmatrix}\begin{pmatrix} U_{ab} \\ U_{bc} \end{pmatrix} \quad (A29)$$

Which means that $$I_a = \frac{z_\delta U_{ab} + z_\beta U_{bc}}{d} \quad (A30)$$

$$I_b = \frac{-z_\gamma U_{ab} + z_\alpha U_{bc}}{d} \quad (A31)$$

that results in $$I_a = \frac{(2\cdot zn_1 + zd_{bb} + zd_{cc})U_{ab} + (zn_1 + zd_{bb})U_{bc}}{d} \quad (A32)$$

$$I_b = \frac{(-zn_1 - zd_{cc})U_{ab} + (zn_1 + zd_{aa})U_{bc}}{d} \quad (A33)$$

The phase current $I_c$ can be written as $I_c=-I_a-I_b$, which gives $$I_c = -\frac{1}{d}[(zn_1 + zd_{bb})U_{ab} + (2\cdot zn_1 + zd_{aa} + zd_{bb})U_{bc}] \quad (A34)$$

It is desirable to express the phase currents in the corresponding phase voltage and an expression which includes the three damping impedances $zd_{aa}$, $zd_{bb}$, $zd_{cc}$ and also the network positive impedance $zn_1$. The calculations utilize that the source voltages $U_a$, $U_b$ and $U_c$ are symmetrical. This means they all have the same magnitude, and that $U_b$ lags $U_a$ with 120 degrees, and that $U_c$ leads $U_a$ with 120 degrees. We use the operator a, as $$a = -\frac{1}{2} + j\frac{\sqrt{3}}{2} = \exp\left(j\frac{2\pi}{3}\right) = 1\angle 120°,$$

The operator gives a positive phase shift of 120 degrees. We get the following equations.

$$U_a = aU_b = a^2 U_c \quad \text{(A35)}$$

$$U_b = a^2 U_a = aU_c \quad \text{(A36)}$$

$$U_c = aU_a = a^2 U_b \quad \text{(A37)}$$

The expression for the phase current $I_a$ is re-written by substituting the other phase voltages, $$I_a = \frac{U_a}{d}[(2 \cdot zn_1 + zd_{bb} + zd_{cc})(1-a^2) + (zn_1 + zd_{bb})(a^2 - a)]$$

$$I_a = \frac{U_a}{d}\left[(2 \cdot zn_1 + zd_{bb} + zd_{cc})\left(\frac{3}{2} + j\frac{\sqrt{3}}{2}\right) + (zn_1 + zd_{bb})\left(-j\sqrt{3}\right)\right]$$

$$I_a = \frac{U_a}{d}\left[3 \cdot zn_1 + \frac{3}{2}(zd_{bb} + zs_{cc}) + j\frac{\sqrt{3}}{2}(zd_{cc} - zs_{bb})\right]$$

For the phase current $I_b$ we get $$I_a = \frac{U_b}{d}[(-zn_1 - zd_{cc})(a-1) + (zn_1 + zd_{aa})(1-a^2)]$$

$$I_a = \frac{U_b}{d}\left[(-zn_1 - zd_{cc})\left(-\frac{3}{2} + j\frac{\sqrt{3}}{2}\right) + (zn_1 + zd_{aa})\left(\frac{3}{2} + j\frac{\sqrt{3}}{2}\right)\right]$$

$$I_a = \frac{U_b}{d}\left[3 \cdot zn_1 + \frac{3}{2}(zd_{aa} + zd_{cc}) + j\frac{\sqrt{3}}{2}(zd_{aa} - zd_{cc})\right]$$

For the phase current $I_c$ we get $$I_c = -\frac{1}{d}[(zn_1 + zd_{bb})U_{ab} + (2 \cdot zn_1 + zd_{aa} + zd_{bb})U_{bc}]$$

$$I_c = -\frac{U_c}{d}[(zn_1 + zd_{bb})(a^2 - a) + (2 \cdot zn_1 + zd_{aa} + zd_{bb})(a-1)]$$

$$I_c = \frac{U_c}{d}[(zn_1 + zd_{bb})(a - a^2) + (2 \cdot zn_1 + zd_{aa} + zd_{bb})(1-a)]$$

$$I_c = \frac{U_c}{d}\left[(zn_1 + zd_{bb})(j\sqrt{3}) + (2 \cdot zn_1 + zd_{aa} + zd_{bb})\left(\frac{3}{2} - j\frac{\sqrt{3}}{2}\right)\right]$$

$$I_c = \frac{U_c}{d}\left[3 \cdot zn_1 + \frac{3}{2}(zd_{aa} + zd_{bb}) + j\frac{\sqrt{3}}{2}(zd_{bb} - zd_{aa})\right]$$

Summary of phase currents at three-phase faults without ground connection $$I_a = \frac{U_a}{d}\left[3 \cdot zn_1 + \frac{3}{2}(zd_{cc} + zd_{bb}) + j\frac{\sqrt{3}}{2}(zd_{cc} - zd_{bb})\right] \quad \text{(A38)}$$

$$I_b = \frac{U_b}{d}\left[3 \cdot zn_1 + \frac{3}{2}(zd_{aa} + zd_{cc}) + j\frac{\sqrt{3}}{2}(zd_{aa} - zd_{cc})\right] \quad \text{(A39)}$$

$$I_c = \frac{U_c}{d}\left[3 \cdot zn_1 + \frac{3}{2}(zd_{bb} + zd_{aa}) + j\frac{\sqrt{3}}{2}(zd_{bb} - zd_{aa})\right] \quad \text{(A40)}$$

Identical Damping Impedances Result in Zero Negative Sequence Current

Assume that all damping impedances are identical, that is, $$zd_{aa} = zd_{bb} = zd_{cc} \quad \text{(A41)}$$

This results in the phase currents $$I_a = \frac{U_a \cdot 3 \cdot (zn_1 + zd_{aa})}{d} \quad \text{(A42)}$$

$$I_b = \frac{U_b \cdot 3 \cdot (zn_1 + zd_{aa})}{d} \quad \text{(A43)}$$

$$I_c = \frac{U_c \cdot 3 \cdot (zn_1 + zd_{aa})}{d} \quad \text{(A44)}$$

The negative sequence current becomes $$`I_2 = \frac{1}{3}(I_a + a^2 I_b + aI_c) = \frac{3 \cdot (zn_1 + zd_{aa}) \cdot (U_a + a^2 U_b + aU_c)}{d} \quad \text{(A45)}$$

We substitute $U_b = a^2 U_a$ and $U_c = aU_a$, which give $$I_2 = \frac{3 \cdot (zn_1 + zd_{aa}) \cdot U_a(1 + a^4 + a^2)}{d} = 0 \quad \text{(A46)}$$

Since the factor $(1+a^4+a^2)=1+a+a^2=0$, then it follows that identical damping impedances will not produce any negative sequence current, that is, it will be zero. Note that this always applies and is independent of the numerical values of $zn_1$ and $zd_{aa}$. Thus, in order to have a non-zero negative sequence current at three-phase faults, the three damping impedances cannot be identical in both magnitude and phase angle.

APPENDIX A, Part 2—TWO-PHASE (LINE-TO-LINE) SHORT CIRCUIT

Consider a two-phase short-circuit without ground connection at the remote end of a line in the network. Let $U_a$, $U_b$, $U_c$ be the phase voltages for the feeding source, and $U_f$ is the voltage at the fault location, and $zf_{aa}$, $zf_{bb}$, $zf_{cc}$ and $zf_{ab}$ are impedances according to the equations (A7), (A8), A9), (A10).
The equations at the fault location are $$U_a = zf_{aa}I_a + zf_{ab}I_b + zf_{ab}I_c + U_f \quad \text{(A47)}$$

$$U_b = zf_{ab}I_a + zf_{bb}I_b + zf_{ab}I_c + U_f \quad \text{(A48)}$$

The task is to calculate the phase currents $I_a$, $I_b$, and $I_c$, using known values for other parameters and variables. For a short circuit between phases a and b (L1 and L2 according to European IEC notations), we get that $I_b = -I_a$ and $I_c = 0$.
The voltage at the fault location is eliminated by using the equations for the main voltage $U_{ab} = U_a - U_b$, which implies $$U_{ab} = (zf_{aa} - zf_{ab})I_a + (zf_{ab} - zf_{bb})I_b \quad \text{(A49)}$$

The current $I_b$ is substituted by $I_b = -I_a$, which gives $$U_{ab}(zf_{aa} + zf_{bb} - 2 \cdot zf_{ab})I_a \quad \text{(A50)}$$

The matrix elements are given by equations (A7), (A8), (A9), (A10) above, which results in $$U_{ab} = (zd_{aa} + zd_{bb} + 2 \cdot (zn_{aa} - zn_{ab}))I_a \quad \text{(A51)}$$

We like to get an expression where the network impedances are given in symmetrical components, rather than phase quantities, and therefore use equations (A12), (A13) and (A14). For a two-phase short circuit between phases a and b, we get
Short circuit a-b;

$$I_a = \frac{U_{ab}}{(zd_{aa} + zd_{bb} + 2 \cdot zn_1)} \tag{A52.1}$$

$$I_b = -I_a \tag{A52.2}$$

$$I_c = 0 \tag{A52.3}$$

For a two-phase short circuit between phase b and c we get
Short circuit b-c;

$$I_b = \frac{U_{bc}}{(zd_{bb} + zd_{cc} + 2 \cdot zn_1)} \tag{A53.1}$$

$$I_c = -I_b \tag{A53.2}$$

$$I_a = 0 \tag{A53.3}$$

For a two-phase short circuit between phase c and a we get
Short circuit c-a;

$$I_c = \frac{U_{ca}}{(zd_{cc} + zd_{aa} + 2 \cdot zn_1)} \tag{A54.1}$$

$$I_a = -I_c \tag{A54.2}$$

$$I_b = 0 \tag{A54.3}$$

APPENDIX A, Part 3 SINGLE PHASE GROUND FAULT

Consider a single-phase ground fault at the remote end of a line in the network. Let $U_a$, $U_b$, $U_c$ be the phase voltages for the feeding source, $U_f$ is the voltage at the fault location, $zf_{aa}$, $zf_{bb}$, $z_{cc}$ and $zf_{ab}$ are impedances according to the equations (A7), (A8), (A9), (A10). The notation $r_f$ is used for the resistance at the fault location. The equation at the fault location is $$U_a = zf_{aa}I_a + zf_{ab}I_b + zf_{ab}I_c + r_f I_a \tag{A55}$$

The task is to calculate the phase currents $I_a$, $I_b$, and $I_c$, given known values for other parameters and variables. For a ground fault between phase a and ground (earth), we have $I_a \neq 0$ and $I_b = I_c = 0$. We get the equation $$U_a = (zf_{aa} + r_f)I_a \tag{A56}$$

For the impedance applies that $zf_{aa} = zd_{aa} + zn_{aa}$ where $zn_{aa} = \frac{1}{3}(zn_0 + 2 \cdot zn_1)$
The results is, $$U_a = (zd_{aa} + r_f + \tfrac{1}{3}zn_0 + \tfrac{2}{3}zn_1)I_a \tag{A57}$$

Thus, for a ground fault in phase a we get,
Ground fault a;

$$I_a = \frac{3 \cdot U_a}{3 \cdot zd_{aa} + 3 \cdot r_f + 2 \cdot zn_1 + zn_0} \tag{A58.1}$$

$$I_b = I_c = 0 \tag{A58.2}$$

For a ground fault in phase b we get,
Ground fault b;

$$I_b = \frac{3 \cdot U_b}{3 \cdot zd_{bb} + 3 \cdot r_f + 2 \cdot zn_1 + zn_0} \tag{A59.1}$$

$$I_a = I_c = 0 \tag{A59.2}$$

For a ground fault in phase c we get,
Ground fault c;

$$I_c = \frac{3 \cdot U_c}{3 \cdot zd_{cc} + 3 \cdot r_f + 2 \cdot zn_1 + zn_0} \tag{A60.1}$$

$$I_a = I_b = 0 \tag{A60.2}$$

REFERENCES

[A1995] Anderson, P. M. *Analysis of Faulted Power Systems*, reprint by IEEE Press, Piscataway, USA, ISBN 0-7803-1145-0, 1995.

[P1977] Phadke, A. G., Ibrahim, M., Hlibka, T. *Fundamental basis for distance relaying with symmetrical components*, IEEE Transaction on Power Apparatus and Systems, Volume: 96, Issue 2, page 635-646, March 1977.

The invention claimed is:
1. A method for detecting faults in and protection of electrical networks, where the electrical networks being fed from a transformer station through a first three phase switching device with a circuit breaker, a distribution network and multiple feeders, the method comprising:
   connecting a second three-phase switching device with circuit breaker before the feeders,
   detecting a short circuit current in the second three-phase switching device,
   connecting damping impedances that are connected in parallel with the circuit breaker of the second three-phase switching device in series between the first three-phase switching device and the outgoing feeders when a short circuit current is detected, thus limiting the short-circuit current,
   wherein at least one of the damping impedances has at least one property that deviates from the other damping impedances, so as to produce a negative sequence current detectable in the electrical networks,
   bypassing the damping impedances by the circuit breaker of the second switching device after a predetermined period of time.
2. A method according to claim 1, comprising dimensioning of the damping impedances, so that the short circuit current magnitude is below a rated current of the distribution network.
3. A method according to claim 1, comprising the dimensioning of the damping impedances such that the magnitude of the damping impedances are larger than the magnitude of the distribution network impedances.
4. A method according to claim 1 comprising coupling of the damping impedances in series between the first three-phase switching device and the outgoing feeders, when at least one phase current with a higher current than 100 A is detected.

5. A method according to claim 1, comprising bypassing the damping impedances with the circuit breaker of the second switching device after 1 second.

6. A method according to claim 1, comprising dimensioning of the first three-phase switching device so that its circuit breaker is activated for current magnitudes which exceed a maximum allowed load current.

7. A device for fault detection and protection of electrical networks, where the electrical networks are fed from a transformer station through a first three-phase switching device with circuit breaker, including a distribution network and feeders, characterized in that a second three-phase switching device with circuit breaker is connected between the transformer station and the outgoing feeders, that the second three-phase switching device comprises an automatic switching control that detects current which exceed the maximal rating of the network, that a set of damping impedances is coupled in parallel with the circuit breaker of the second three-phase switching device, wherein at least one of the damping impedances has at least one characteristic which deviates from the other damping impedances, so as to achieve a negative sequence current which is detectable in the electrical networks, the second three-phase switching device with circuit breaker being arranged to by-pass the damping impedances after a predetermined period of time.

8. A device according to claim 7, comprising a plurality of feeders in the distribution network that are connected to a third switching device with load disconnectors or with contactors.

9. A device according to claim 7, comprising a plurality of secondary substations connected after the third switching device, that use load disconnectors, and at least one intermediate secondary substation equipped with load disconnectors and relay protection and provided between said secondary substations.

\* \* \* \* \*